(12) United States Patent
Klein et al.

(10) Patent No.: US 9,137,593 B2
(45) Date of Patent: Sep. 15, 2015

(54) LOUDSPEAKER WITH PORT COMPRISING A PARTICLE FILTER

(75) Inventors: Erich Klein, Himberg (AT); Ernst Tomas, Stasshof an der Nordbahn (AT)

(73) Assignee: Knowles IPC (M) Sdn. Bhd., Penang (MY)

( * ) Notice: Subject to any disclaimer, the term of this patent is extended or adjusted under 35 U.S.C. 154(b) by 0 days.

(21) Appl. No.: 14/115,592

(22) PCT Filed: May 3, 2012

(86) PCT No.: PCT/EP2012/058060
§ 371 (c)(1),
(2), (4) Date: Nov. 4, 2013

(87) PCT Pub. No.: WO2012/150277
PCT Pub. Date: Nov. 8, 2012

(65) Prior Publication Data
US 2014/0079252 A1 Mar. 20, 2014

(30) Foreign Application Priority Data

May 3, 2011 (EP) .................................... 11164611

(51) Int. Cl.
*H04R 25/00* (2006.01)
*H04R 1/02* (2006.01)
*H04R 9/02* (2006.01)
*H04R 1/08* (2006.01)
*H04M 1/02* (2006.01)

(52) U.S. Cl.
CPC ............... *H04R 1/028* (2013.01); *H04M 1/026* (2013.01); *H04R 1/02* (2013.01); *H04R 1/023* (2013.01); *H04R 1/086* (2013.01); *H04R 9/025* (2013.01); *H04R 2499/11* (2013.01)

(58) Field of Classification Search
CPC .......... H04R 1/02; H04R 1/023; H04R 1/086; H04R 9/025; H04R 9/06; H04R 9/10; H04R 2209/022; H04R 2499/11; H04M 1/026
USPC ......... 381/401, 402, 412, 414, 420, 421, 422, 381/386, 391, 189; 455/569.1, 575.1
See application file for complete search history.

(56) References Cited

U.S. PATENT DOCUMENTS

| | | | |
|---|---|---|---|
| 3,129,298 A * | 4/1964 | Hofman | 381/189 |
| 5,918,272 A | 6/1999 | Snyder et al. | |
| 6,086,657 A | 7/2000 | Freije | |
| 6,744,895 B2 * | 6/2004 | Miyamoto et al. | 381/182 |
| 7,519,191 B2 * | 4/2009 | Enomoto et al. | 381/186 |
| 7,548,627 B2 * | 6/2009 | Takase et al. | 381/189 |

FOREIGN PATENT DOCUMENTS

| | | |
|---|---|---|
| DE | 2359416 | 6/1975 |
| EP | 1079662 | 2/2001 |
| WO | 2008018007 | 2/2008 |

OTHER PUBLICATIONS

European Search Report and European Search Opinion, Appl. No. EP 11164611.3, Sep. 20, 2011.

* cited by examiner

*Primary Examiner* — Huyen D Le
(74) *Attorney, Agent, or Firm* — Steven McMahon Zeller; Dykema Gossett PLLC

(57) ABSTRACT

A loudspeaker in which a magnetic particle filter is provided in the vicinity of a sound outlet port.

6 Claims, 4 Drawing Sheets

LOUDSPEAKER WITH PORT COMPRISING A PARTICLE FILTER

FIELD OF INVENTION

This invention relates to a loudspeaker, for example a loudspeaker used as the earpiece (sometimes known as the receiver) of a mobile phone.

BACKGROUND OF INVENTION

Figure 1:
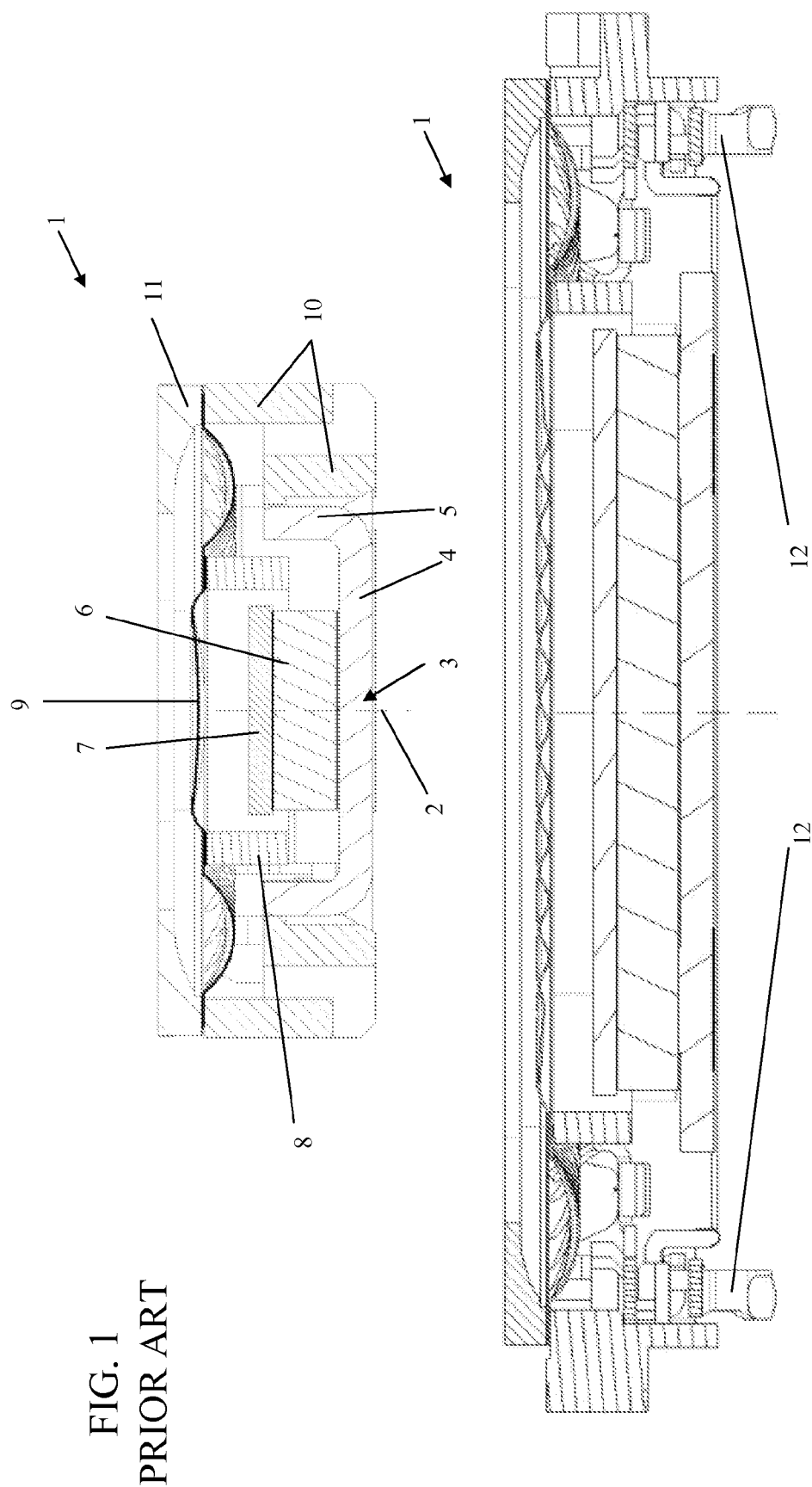

FIG. 1 shows a known loudspeaker unit which is rectangular in shape, and shows two cross sectional views. The loudspeaker 1 is essentially centrally symmetrical in design, and has a central vertical axis 2.

The loudspeaker has a pot-shaped housing 3, which is made of metal and which has a base wall 4 and a side wall 5.

The housing 3 supports a permanent magnet 6 such as NdFeB, and a top metal plate 7. The voice coil 8 surrounds the magnet 6 and is suspended from the plastic membrane 9.

An outer plastic basket 10 supports the membrane 9, and a metal cover 11 is provided over the membrane. The cover 11 has sound transmission openings.

The lower cross section shows the electrical contacts 12 to the voice coil.

The unit 3 can have a height of 1-5 mm, and the length and width of the unit 3 in the direction running perpendicular to the direction of axis 2 can for example each be in the range 5-20 mm. These dimensions are simply to give an idea of the scale and are in no way limiting. The loudspeaker 1 is for example provided for use in a mobile telephone or in similar small scale telecommunications apparatus.

The membrane 9 is essentially U-shaped in its peripheral area. The membrane 9 has an intermediate area adjacent to the U-shaped peripheral area to which the voice coil 8 is connected. A central area is for sound generation. The membrane 9 as a whole is arranged to be oscillatory with movement in the direction of axis 2.

The magnetic field generated by the voice coil 8 interacts with the magnet 6, wherein an electrical signal representing a signal to be reproduced acoustically is sent to the voice coil 8, as a result of which the voice coil is caused to oscillate, which results in the membrane 9 bringing about the signal to be reproduced acoustically.

The electrical drive signal can be amplified and, if applicable, its signal waveform can be influenced, before being sent to the voice coil 8. An integrated circuit for this purpose can optionally be provided as part of the design.

The acoustic outlet ports which in this example are in the top surface of the cover 11 expose at least some of the speaker components to the environment. The components can be sensitive to moisture, to dust and to other contaminants.

In particular, magnetic particles are attracted by the permanent magnet 6. These particles can come from any debris (for example from keys in the pocket or also from the dust that occurs from machining metal in a workshop). Especially these magnetic dust particles create serious problems for the function of the device. The particles can be smaller than the opening size of physical filters. If enough of these small particles are attracted to the membrane by the magnet (on the opposite side), the movement of the membrane will be influenced or it can even become blocked. If the vent openings are on the other side of the membrane (i.e. on the voice coil side), then particles can influence the voice coil movement.

These problems can arise after the customer has started using a perfectly functioning device, and can thus shorten the lifespan of the device in which the loudspeaker is incorporated.

The invention is applicable to this loudspeaker design, but it is applicable more generally to loudspeakers, and is directed generally to the problem of contamination of the internal components through the sound outlet port.

SUMMERY OF INVENTION

According to the invention, there is provided a loudspeaker comprising:
a membrane for generating a sound pressure wave in response to an electrical signal; and
a port through which the sound pressure wave passes,
wherein the loudspeaker comprises a particle filter in the vicinity of the port, and which comprises a permanent magnet.

The invention provides a particle (e.g. dust) dust filter in the form of a magnet at the sound outlet port. This filters and collects magnetic particles before they reach the sensitive internal parts of the device.

The device can comprise an outer casing, with the port defined in a wall of the outer casing, and the permanent magnet within the outer casing adjacent the port.

The loudspeaker of the invention can be used as the earpiece speaker (the receiver speaker) of a mobile telephone The invention also provides a filtering method for protecting a loudspeaker from particles, comprising providing a particle filter in the vicinity of a sound outlet port of the loudspeaker, and which comprises a permanent magnet.

SHORT DESCRIPTION OF THE DRAWINGS

Figure 2:
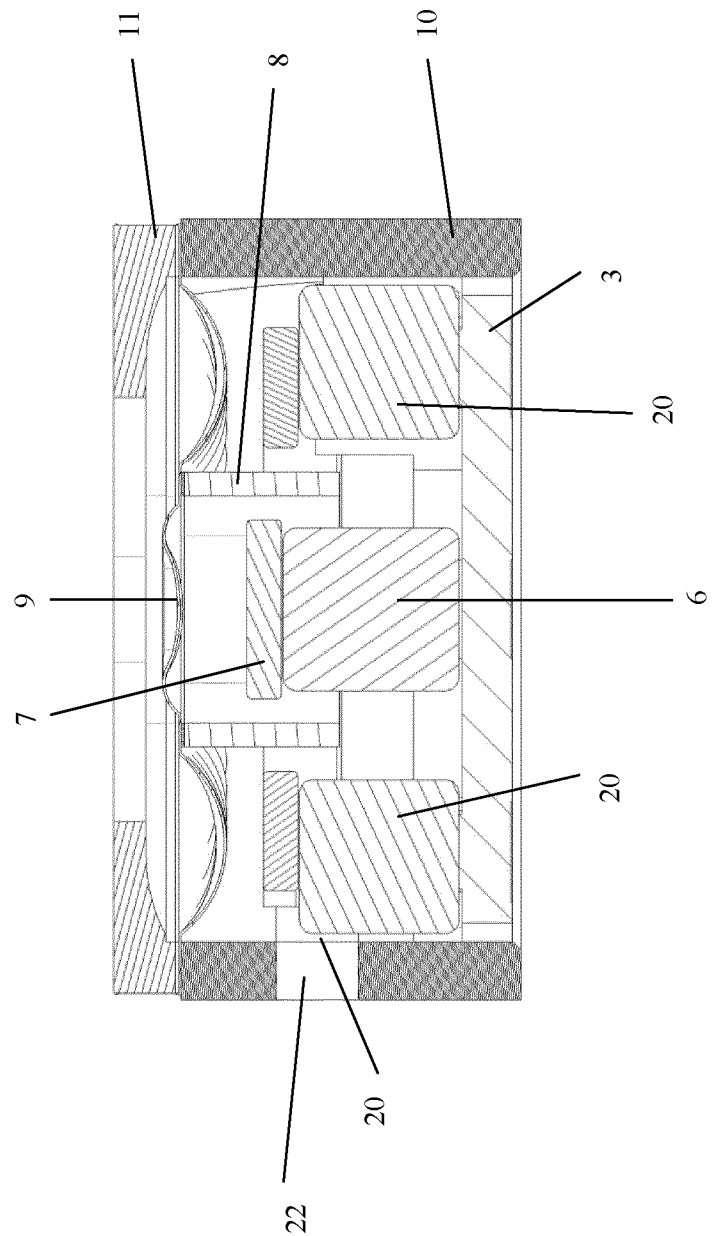
Figure 3:
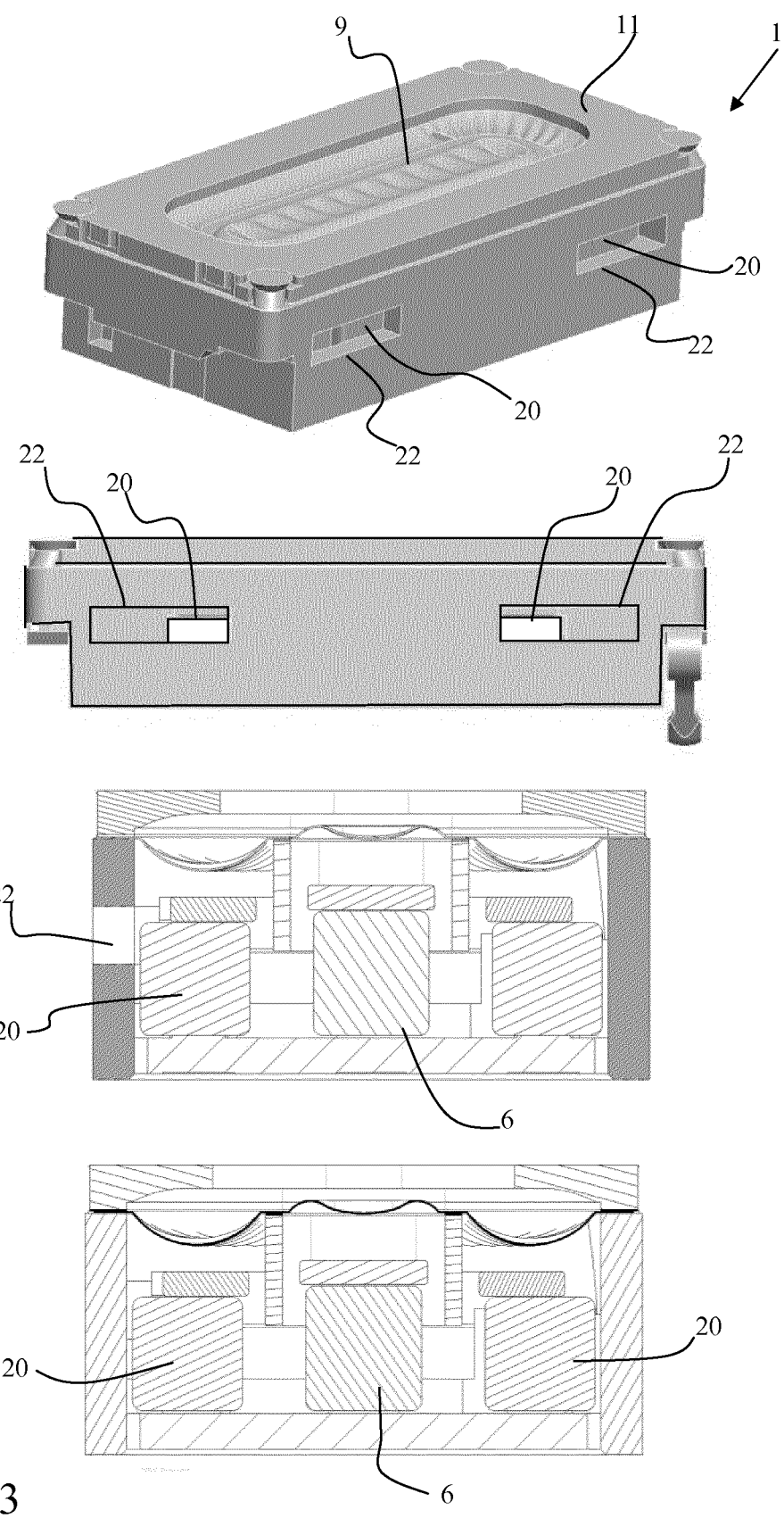
Figure 4:
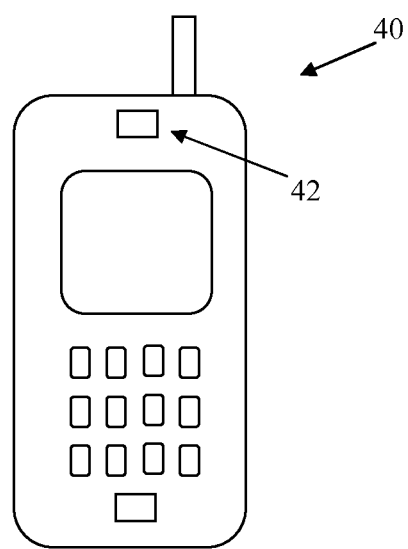

Examples of the invention will now be described in detail with reference to the accompanying drawings, in which:
FIG. 1 shows two cross-sections through an example of a prior art loudspeaker;
FIG. 2 shows a single cross section of a loudspeaker design of the invention;
FIG. 3 shows the design of FIG. 2 in perspective view, two cross sections and a side view; and
FIG. 4 shows a mobile telephone using the loudspeaker of the invention.

DETAILED DESCRIPTION OF THE DRAWINGS

The invention provides a loudspeaker in which a magnetic dust filter is provided in the vicinity of a sound outlet port.

FIG. 2 shows a single cross section of a loudspeaker design of the invention.

The same reference numbers are used as in FIG. 1 to denote the same parts.

In addition to the magnet 6 associated with the voice coil 8, there is a further permanent magnet 20 for attracting magnetic particles. The magnet 20 is positioned adjacent the sound port 22, which in this example is on the side of the outer housing (the basket 10). Air flow through the sound port 22 thus passes the magnet 20, which attracts particles before they can collect on the membrane or in the vicinity of the voice coil.

FIG. 3 shows the design of FIG. 2 in perspective view, two cross sections and a side view.

In this example, two sound outlet ports 22 are shown, and the permanent magnet 20 extends between them.

The magnets used are preferably rare earth magnets (NdFeB) for example of grade N48 but also lower grades can be used (N32-N44). The magnetic filtering does not require any airflow, for example a phone incorporating the loudspeaker can be carried in a pocket where the magnetic dust will be attracted without any airflow.

The magnet 20 (or set of magnets) is positioned so that the particles are attracted at a position where they do not influence the movement of the membrane or voice coil. There will be also an additional dust filter in front of the openings to prevent non magnetic dust from entering.

If significant amounts of dust are collected, the performance may still degrade, in the same way that performance degrades when mechanical dust filters become clogged. However, a key advantage is that any reduction of the performance is only slight, and the more significant problem of magnetic particles blocking the membrane/voice coil movement is avoided.

The large degradation of the performance resulting from blocked coils or membranes leads to customer complaints and this level of degradation will be avoided.

The magnet for attracting dust particles can be positioned within a flow path such as a channel designed to ensure that the air flow passes the magnet in a desired way.

The use of magnets to provide filtering of metallic particles from a liquid or gas is known.

The invention can be applied to any number of sound ports and in any position around the casing of the loudspeaker.

The voice coil magnet and the particle filtering magnet can be of the same type, but this is not essential.

The filtering magnet can be shared between multiple sound outlets as mentioned above, or there can be one magnet per sound port.

The particle filtering magnet can be near the surface of the housing, at the sound port, but it may be buried deeper in the housing, but in a passageway to the sound outlet port so that air flow caused by the diaphragm movement passes the magnet. Thus the magnet does not need to be in the direct vicinity of the sound port but can be displaced as long as it is connected to the outlet by a passage. The term "vicinity" should be understood accordingly.

Ideally, the particle filtering magnet should be between the sound outlet port and the voice coil permanent magnet or membrane or voice coil, so that it is positioned before other components when following the air passage into the speaker from the sound outlet port.

FIG. 4 shows a mobile telephone 40 using a loudspeaker 42 of the invention as the earpiece (receiver).

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A loudspeaker comprising:
   an outer casing
   a membrane for generating a sound pressure wave in response to an electrical signal, the membrane located within the outer casing;
   a port defined in a wall of the outer casing through which the sound pressure wave passes; and
   a magnetic particle filter located within the outer casing in the vicinity of the port and within the path of the sound pressure wave between the membrane and the port, the magnetic particle filter comprising a permanent magnet.

2. A loudspeaker as claimed in claim 1, wherein the permanent magnet comprises a rare earth magnet.

3. A loudspeaker as claimed in claim 2, wherein the permanent magnet comprises a NdFeB magnet.

4. A loudspeaker as claimed in claim 1, further comprising a voice coil and a voice coil permanent magnet associated with the voice coil, wherein the voice coil permanent magnet and the particle filter permanent magnet are of the same type.

5. A mobile telephone comprising:
   an outer casing;
   a membrane for generating a sound pressure wave in response to an electrical signal, the membrane located within the outer casing;
   a port defined in a wall of the outer casing through which the sound pressure wave passes; and
   a magnetic particle filter located within the outer casing in the vicinity of the port and within the path of the sound pressure wave between the membrane and the port, the magnetic particle filter comprising a permanent magnet.

6. A method for protecting a loudspeaker from magnet particles, the method comprising the steps of:
   providing a casing for a loudspeaker, the loudspeaker comprising a membrane for generating a sound pressure wave in response to an electrical signal;
   providing a sound outlet in a wall of the outer casing; and
   providing a particle filter inside the outer casing in the vicinity of the sound outlet port and in the path of the sound pressure wave between the membrane and the sound outlet port, wherein the particle filter comprises a permanent magnet.

* * * * *